March 11, 1952 — L. DE MARCO — 2,588,911
CENTRIFUGALLY RESPONSIVE GOVERNOR
Filed Aug. 27, 1949 — 2 SHEETS—SHEET 1
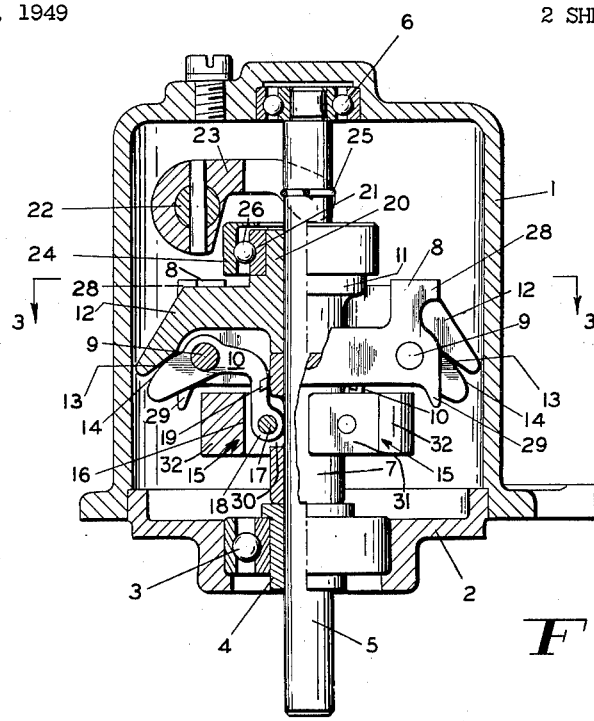
*Fig_1_*
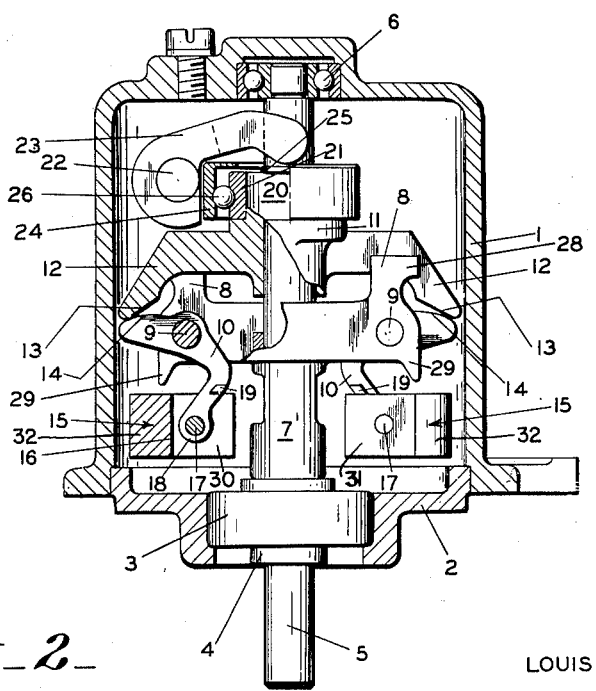
*Fig_2_*
INVENTOR.
LOUIS DE MARCO
BY
Frank H. Harmon
ATTORNEY March 11, 1952 — L. DE MARCO — 2,588,911
CENTRIFUGALLY RESPONSIVE GOVERNOR
Filed Aug. 27, 1949 — 2 SHEETS—SHEET 2
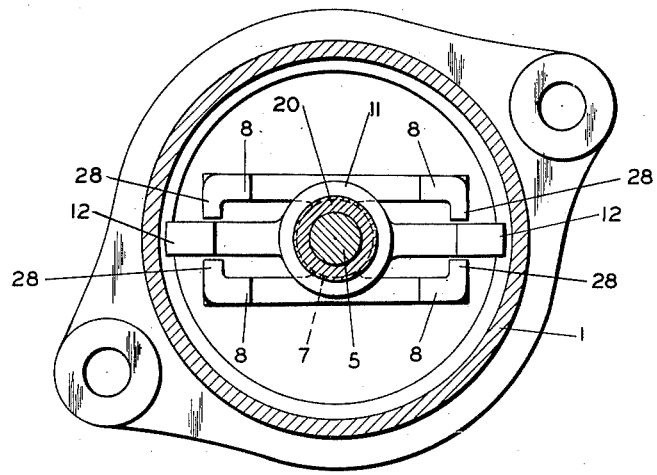
Fig_3_
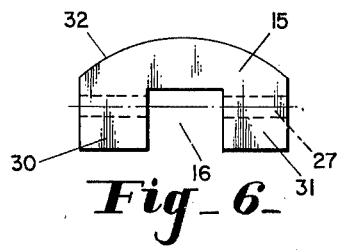
Fig_6_
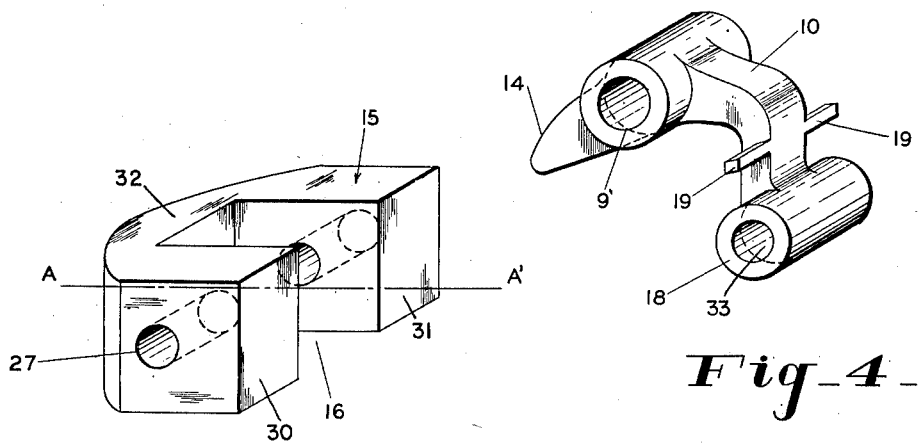
Fig_5_
Fig_4_
INVENTOR.
LOUIS DE MARCO
BY
ATTORNEY Patented Mar. 11, 1952

2,588,911

UNITED STATES PATENT OFFICE 2,588,911

CENTRIFUGALLY RESPONSIVE GOVERNOR

Louis De Marco, Cleveland, Ohio

Application August 27, 1949, Serial No. 112,700

9 Claims. (Cl. 264—15)

This invention relates in general to governors and more particularly to governors of the type employing rotating centrifugally responsive pivoted weight elements.

In the conventional governor construction the centrifugally responsive weights are so mounted about their pivots that the mass of each weight in its pivotal movements between fully retracted, or closed, position and its fully extended, or open, position, describes an arc.

The main factors that determine the power of the weight are its radial position, speed and leverage. As long as the weight mass is pivotally fixed to swing in an arc, there necessarily exists undesirable unproportional changes of weight power throughout the pivotal movements of the weight. This undesirable condition renders it impossible to obtain an opposing spring action that will accurately follow the variations in weight power resulting from the arcuate swing of the weight mass. This varying weight power necessarily results in such fixed weights because of corners, or protruding masses that are inherent in the weight and that swing arcuately inwardly and outwardly about the weight pivot. These protruding masses continuously change the weight leverage throughout the weight travel and produce unproportional variations in weight power. This is undesirable because in certain weight positions it offsets the gradual increase or decrease of weight power that would be expected if the centrifugal forces of the weight were computed on radial position, speed and leverage of the center of gravity of the weight mass.

One of the primary objects of my invention is to obtain in a governor such an action as is necessary to provide a centrifugally responsive weight that is so pivotally mounted that it floats with the centerline of the weight mass at all times maintained to be in a plane normal to the main rotary governor shaft.

Another object of my invention is to provide in a governor centrifugally responsive weights whose weight power will gradually increase and decrease in relation to opposing spring action so as to obtain maximum stability, accuracy and sensitivity.

Another object is to provide such a centrifugal weight, the centerline of the mass of which will lie in a plane normal to the main rotary governor shaft throughout the limits of its entire pivotal movement.

Another object is to provide a centrifugal governor weight that is so pivotally mounted by a single pivotal connection to the weight arm between the weight mass and the governor shaft that it floats with the centerline of the mass at all times maintained to be in a plane perpendicular to the governor shaft.

Another object is to provide in a governor such a floating centrifugally responsive pivoted weight, the engaging surface of which and that of the slider are so related that a frictionless non-slipping rolling action will result.

Another object is to provide in a governor such a floating centrifugally responsive pivoted weight which is free to pivot, without contact with the governor slider, and which latter is rotated by means radially disposed from the main rotary shaft.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in vertical section taken through the governor embodying my invention, showing the centrifugal weights in closed position;

Figure 2 is a view similar to Figure 1, showing the weights in open position;

Figure 3 is a view in section taken along line 3—3 of Figure 1;

Figure 4 is a view in perspective of one of the weight arms with the weight removed;

Figure 5 is a view in perspective of one of the weights removed from its weight arm; and Figure 6 is a plan view of one of the centrifugal weights.

Referring more particularly to the drawings, the governor casing 1 is closed by a removable base 2 that carries an anti-friction bearing 3 in which is supported a collar 4 fixed to the rotary governor shaft 5. The upper end of the shaft is mounted in an anti-friction bearing 6 pressed into an appropriate socket in the top of the casing.

Just above collar 4 there is fixed upon shaft 5 a bracket comprising a sleeve 7 having integral spaced parallel arms 8. Arms 8 of the bracket support a pair of pivots 9 for weight arms 10. These pivots 9 are parallel to each other and relatively close to and disposed in a plane normal to the governor shaft 5.

Loosely surrounding shaft 5 and above sleeve 7 is a slider 11 having a pair of diametrically opposed legs 12 radially removed from the governor shaft 5. The slider is guided in its sliding movements on the governor shaft and caused to rotate with the bracket by inwardly extending outer tips 28 of the weight bracket arms 8 which straddle with slight clearance the slider arms 12. If desired, this straddling relationship may be reversed. Thus, the force exerted for transmitting rotation of the bracket to the slider is at points appreciably radially outwardly of the governor shaft. This tends to reduce friction over any construction employing a splined connection between the shaft and slider or a drive relatively close to the shaft. Moreover, in my construction the drive of the slider is entirely removed from and independent of the weight arms 10 and does not interfere with their free pivoting, as distinguished from the disclosure of the U. S. patent to Rollason, 394,300 of December 11, 1888, in which latter the rotative movements of the slider are imparted by engagement of the weight arms with spokes of the slider so as to materially interfere with the pivotal action of the weights.

The slider legs 12 are shown as having straight under surfaces 13 that are undercut to be inclined to extend radially inwardly and upwardly from the external tips of the surfaces. The upper surfaces 14 of the weight arms 10 outboard of the pivots 9 are shown to have a long radius of curvature upon which the under surfaces 13 of the slider ride in surface engagement. While this is the preferred arrangement, it is possible to reverse the same by having the upper surfaces 14 straight and inclined and the undercut surfaces 13 provided with a long radius of curvature. The important consideration from the viewpoint of operation is to so predetermine the nature of the two different types of engaging surfaces that the curved surface will roll upon straight surface without slippage so as to eliminate friction that would otherwise interfere with the pivotal movements of the weight arms to produce retarded and erratic operation of the governor.

At the upper end of the slider 11 there is a constriction 20 upon which is fitted the inner race 21 of a bearing having balls 26. A conventional control shaft 22 is mounted in suitable bearings carried by the casing 1. This shaft has a yoke 23 pinned thereto with bifurcations which are spring urged by conventional means to bear downwardly upon the ball bearing assembly at the top of the slider. Upward movement of slider 11 may be limited by means of a snap ring 25 mounted in an annular groove formed in the governor shaft and be adapted to be engaged by constriction 20 of the slider as a limit stop.

In my previous U. S. patent, No. 2,464,853 for Governor, March 22, 1949, I have shown what I choose to term fixed weights. By this term I mean that the weights are rigid. In my present construction I propose to employ floating weights, instead. Accordingly, I have shown a pair of weight elements 15, centrally recessed at 16 to be U-shaped with a mass portion 32 and legs 30 and 31 and having pins 17 extending through holes 27 in weight 15 and through a hole 33 in the hollow barrel bearings 18 of the weight supporting arms 10. Whether the pins 17 are fixed to the weight arm or to the weights themselves, the weights 15 are mounted to be floating, as this single pivotal connection is the only connection between the weight and the weight arm. The weights are not restricted to swing in an arc about pivots 9. Instead, the centerline of the weight mass, which lies in a plane normal to the main governor shaft, will also remain perpendicular to the governor shaft throughout all of its movements. What I mean by the term centerline of the weight mass is the centerline designated at A—A' in Figure 5, meaning a centerline extending generally radially of the shaft, rather than a centerline extending vertically or transversely of the weight.

In other words, the sole means of suspension of the weight arm is a single pivot point 9 and the sole means of suspension of the weight is a single pivotal connection between the weight and the weight arm is about pin 17. Moreover, this single pivotal connection by pin 17 between the weight and the weight arm is through legs 30 and 31 and between the heavier mass portion 32 and the governor shaft. The use of this single pivot point connection 17, instead of multiple connections on both sides of the weight, and the disposition of this single pivot point connection through the legs 30 and 31 and thus between the governor shaft and the weight mass 32, insures the swinging of the weight in such a manner that the weight mass remains perpendicular to the governor shaft throughout the limits of the swing of the weight.

Figure 1 shows the weights to be fully retracted, or closed, and Figure 2 shows the weights to be fully extended, or open. In normal operation with the governor disposed upright, as viewed in Figure 2, and during full speed rotation of the shaft, the engagement of constriction 20 of the slider with snap ring 25 acts as a limit stop to upward movement of the slider and outward movement of the weights. When the weights are not being subjected to centrifugal force and spring tension by arm 23, the lugs 19, carried by weight arms 10, contact with the weights to prevent clockwise tipping of the right hand weight about its pivot and counterclockwise tipping of the left hand weight about its pivot. For preventing such undesirable tipping of the weights when the governor is disposed upside down, I provide the weight bracket with integral or rigid lugs 29 to contact with the weights for the same purpose.

Thus it will be seen that I have provided a governor in which I have eliminated the undesirable factor of irregular change of weight power present in the fixed weight. Such an irregular change of weight power makes it practically impossible to obtain an opposing spring action that will follow the variations in weight power. The arcuately swinging fixed weight results in irregular weight power because of protruding masses swinging arcuately about the fixed pivot prescribing the arcuate swing. This results in continuously changing leverage throughout the weight travel to produce an unproportional variation of weight power tending to offset the gradual increase or decrease of power that would be expected if the centrifugal force of the weight were computed on radial position, speed and leverage of the center of gravity of the weight mass. In my present construction employing a floating weight the centerline of the weight mass is always perpendicular to the governor shaft and the above disadvantages of the fixed weight are eliminated. The weight power gradually increases and decreases in relation to opposing spring action so as to obtain maximum stability, accuracy and sensitivity.

Moreover, my floating weight permits positioning of the weight mass farther radially removed from the governor shaft while still maintaining the angle of swing between the two weight pivots 9. Inasmuch as the effective weight masses are farther apart, a lighter or smaller weight may be used, as compared to a fixed weight.

My floating weight has a more flexible and wider application to governors which must fit into restricted places. For instance, a shorter governor may have longer and narrower weights. A smaller housing may be obtained by widening and shortening the weight mass.

With my floating weight construction, a series of different governors with different power outputs may be made with the inside units exactly alike, except for the weight masses which would be of different sizes for the particular purposes.

Moreover, in my floating weight, the cam surfaces 14 weight arms roll, instead of sliding, upon the slider so as to eliminate friction that would impede proper pivotal movements of the weight arm. Friction is further eliminated by reason of a rotational drive of the slider by coacting means which are in straddling relationship and appreciably radially removed from the governor shaft and entirely removed from and independent of the weight arms so as to not interfere with their pivotal movements.

I claim:

1. In a governor having a rotatable shaft and a bracket mounted thereon to be rotated thereby, a weight arm being suspended solely by a single pivotal connection to said bracket to swing about an axis normal to the axis of rotation of said shaft and a centrifugally responsive weight being suspended solely by a single pivotal connection to said weight arm when said weight is under the influence of centrifugal force so as to adapt said weight to swing about an axis normal to the axis of rotation of said shaft.

2. In a governor having a rotatable shaft and a bracket mounted thereon to be rotated thereby, a weight arm being suspended solely by a single pivotal connection to said bracket to swing about an axis normal to the axis of rotation of said shaft and a centrifugally responsive weight being suspended solely by a single pivotal connection to said weight arm when said weight is under the influence of centrifugal force so as to adapt said weight to swing with the centerline of the mass of said weight remaining perpendicular to said shaft throughout its limits of swing.

3. In a governor having a rotatable shaft and a bracket mounted thereon to be rotated thereby, a weight arm being suspended solely by a single pivotal connection to said bracket to swing about an axis normal to the axis of rotation of said shaft and a centrifugally responsive weight being suspended solely by a single pivotal connection to said weight arm when said weight is under the influence of centrifugal force so as to adapt said weight to be floating to swing about an axis normal to the axis of rotation of said shaft.

4. In a governor having a rotatable shaft and a bracket mounted thereon to be rotated thereby, a weight arm being suspended solely by a single pivotal connection to said bracket to swing about an axis normal to the axis of rotation of said shaft and a centrifugally responsive weight being suspended solely by a single pivotal connection to said weight arm when said weight is under the influence of centrifugal force so as to adapt said weight to be floating to swing with the centerline of the mass of said weight remaining perpendicular to said shaft throughout its limits of swing.

5. In a governor having a rotatable shaft and a bracket mounted thereon to be rotated thereby, a weight arm being suspended solely by a single pivotal connection to said bracket to swing about an axis normal to the axis of rotation of said shaft and a U-shaped centrifugally responsive weight with the greater weight mass in the bow of the U and connected to said arm by a pivotal connection through the legs of the U, and thus between the shaft and the greater weight mass of said weight, said last named pivotal connection being the sole means of suspension of said weight when said weight is under the influence of centrifugal force so as to adapt said weight to swing about an axis normal to the axis of rotation of said shaft with the centerline of the mass of said weight remaining perpendicular to said shaft throughout its limits of swing.

6. In a governor having a rotatable shaft and a bracket mounted thereon to be rotated thereby, a weight arm being suspended solely by a single pivotal connection to said bracket to swing about an axis normal to the axis of rotation of said shaft, a slider loosely and slidably mounted on said shaft in non-driving relationship, coacting means carried by said slider and said bracket, independent of weight arm, and radially removed from said shaft and disposed in straddling relationship for imparting rotary movements of said shaft to said slidably mounted slider, a centrifugally responsive weight being suspended solely by a single pivotal connection to said weight arm when said weight is under the influence of centrifugal force so as to adapt said weight to swing about an axis normal to the axis of rotation of said shaft.

7. In a governor having a rotatable shaft and a bracket mounted thereon to be rotated thereby, a weight arm being suspended solely by a single pivotal connection to said bracket to swing about an axis normal to the axis of rotation of said shaft, a slider loosely and slidably mounted on said shaft in non-driving relationship, coacting means carried by said slider and said bracket, independent of weight arm, and radially removed from said shaft and disposed in straddling relationship for imparting rotary movements of said shaft to said slidably mounted slider, a centrifugally responsive weight being suspended solely by a single pivotal connection to said weight arm when said weight is under the influence of centrifugal force so as to adapt said weight to be floating to swing about an axis normal to the axis of rotation of said shaft with the centerline of the mass of said weight remaining perpendicular to said shaft throughout its limits of swing.

8. In a governor having a rotatable shaft and a bracket mounted thereon to be rotated thereby, a weight arm being suspended solely by a single pivotal connection to said bracket to swing about an axis normal to the axis of rotation of said shaft, a slider loosely and slidably mounted on said shaft in non-driving relationship and above said weight arm to have its under surface engage the upper surface of said weight arm, one of said surfaces being straight and inclined and the other surface having an arc of relatively long curvature to produce a frictionless rocking non-slipping engagement of said surfaces during pivotal movements of said weight arm, coacting means carried by said slider and said bracket, independent of said weight arm, and radially removed from said shaft and in straddling relationship for imparting rotary movements of said shaft to said slider, a centrifugally responsive weight being suspended solely by a single pivotal connection to said weight arm when said weight is under the influence of centrifugal force, said last named pivotal connection being between said shaft and the greater mass portion of said weight so as to adapt said weight to be floating to swing about an axis normal to the axis of rotation of said shaft with the centerline of the mass of said weight remaining perpendicular to said shaft throughout its limits of swing.

9. In a governor having a rotatable shaft and a bracket mounted thereon to be rotated thereby, a weight arm being suspended solely by a single pivotal connection to said bracket to swing about an axis normal to the axis of rotation of said shaft and a centrifugally responsive weight being suspended solely by a single pivotal connection to said weight arm when said weight is under the influence of centrifugal force so as to adapt said weight to be floating to swing with the centerline of the mass of said weight remaining perpendicular to said shaft throughout its limits of swing, a limit stop means carried by said bracket adapted to abut said weight when the latter is extended and not centrifugally sustained in order to prevent tipping of said weight, about its pivotal connection to said weight arm, toward said weight bracket.

LOUIS DE MARCO.

REFERENCES CITED

The following references are of record in the file of this patent:

UNITED STATES PATENTS

| Number | Name | Date |
|---|---|---|
| 394,300 | Rollason | Dec. 11, 1888 |
| 676,584 | Maxim | June 18, 1901 |
| 1,089,256 | Pardee | Mar. 3, 1914 |
| 1,585,567 | Sommer | May 18, 1926 |
| 2,230,736 | Warner | Feb. 4, 1941 |
| 2,247,492 | Hale | July 1, 1941 |
| 2,464,853 | De Marco | Mar. 22, 1949 |

FOREIGN PATENTS

| Number | Country | Date |
|---|---|---|
| 9,222 | Great Britain | Apr. 21, 1902 |